June 1, 1954  A. H. HANKS  2,679,680
WIRE-COURSING DIE
Filed Feb. 1, 1947  6 Sheets-Sheet 1
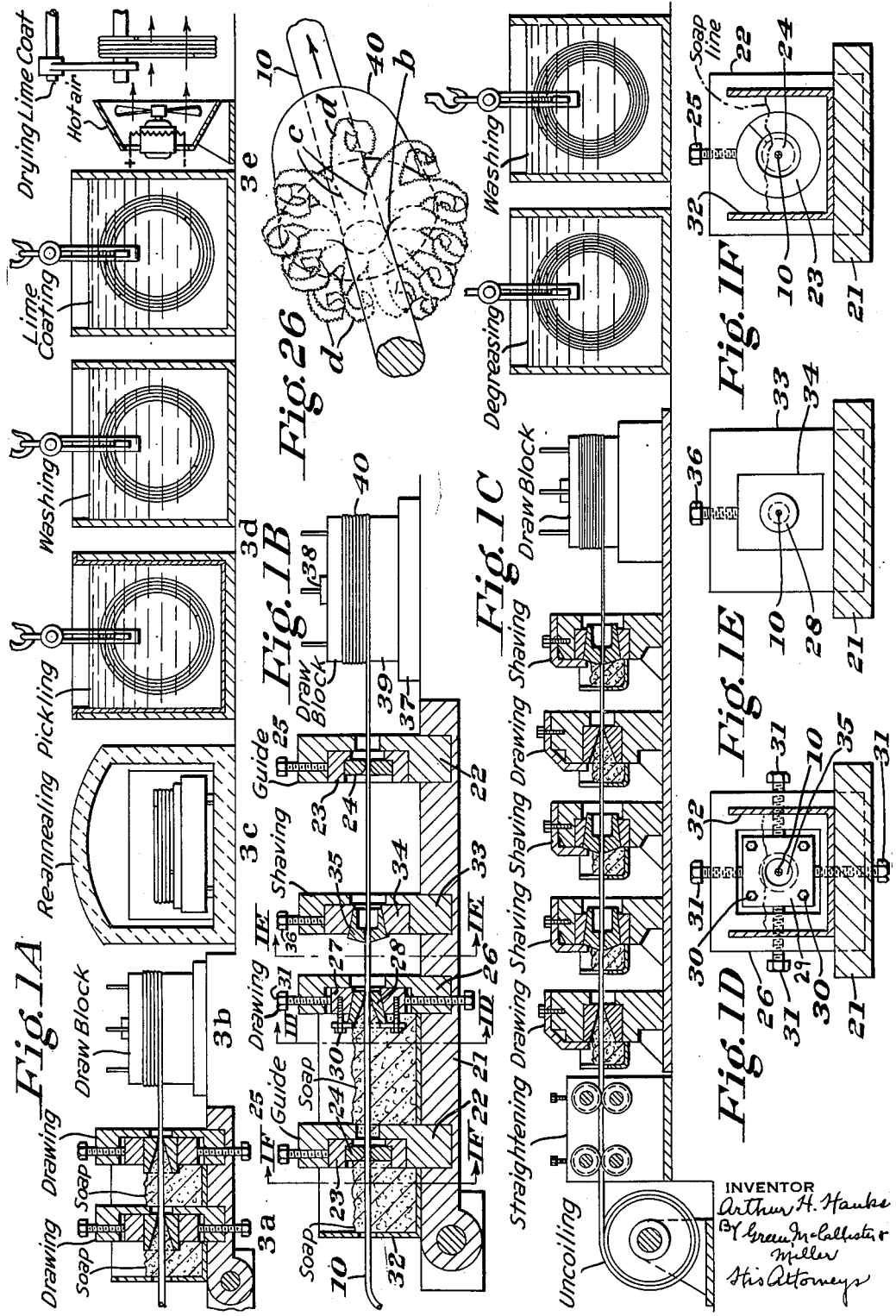

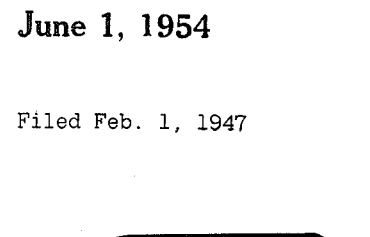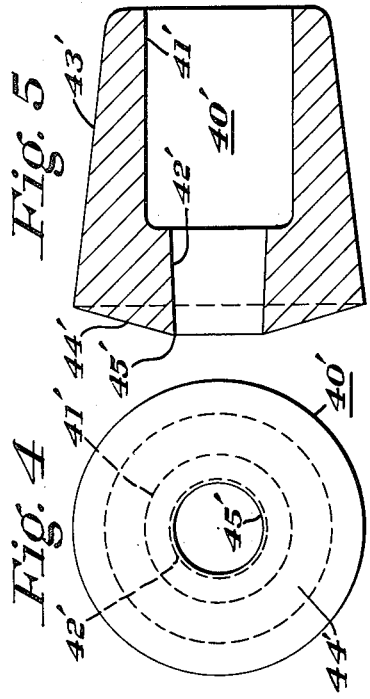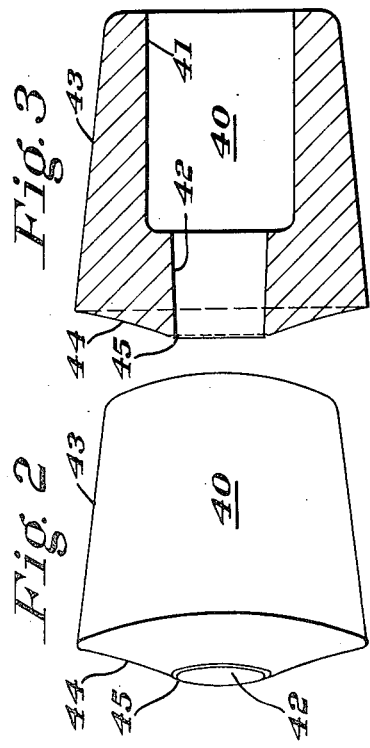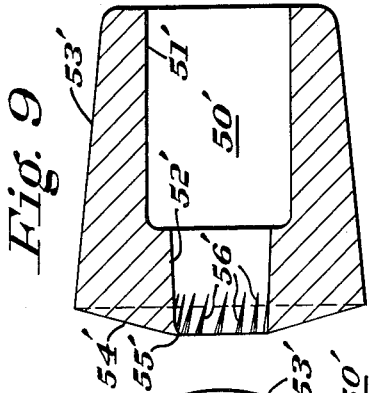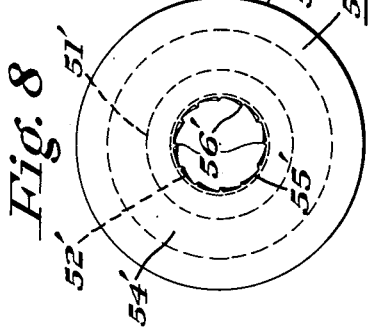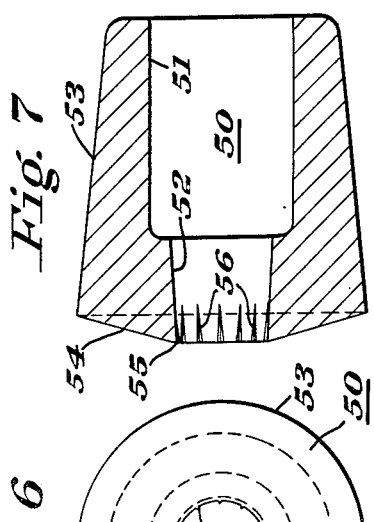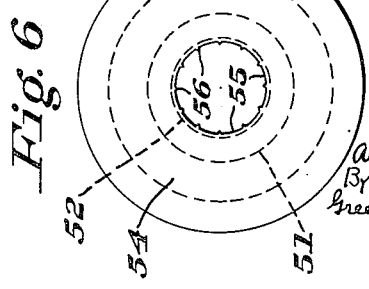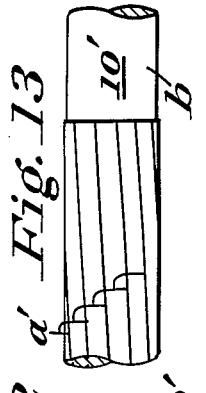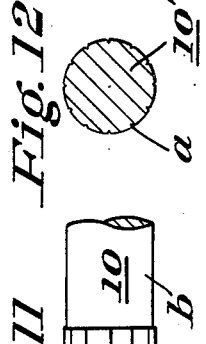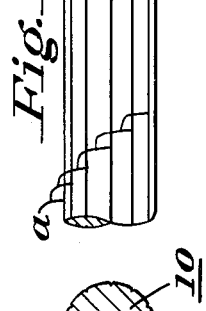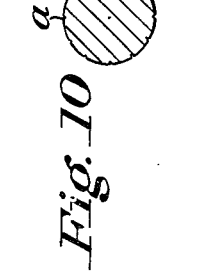

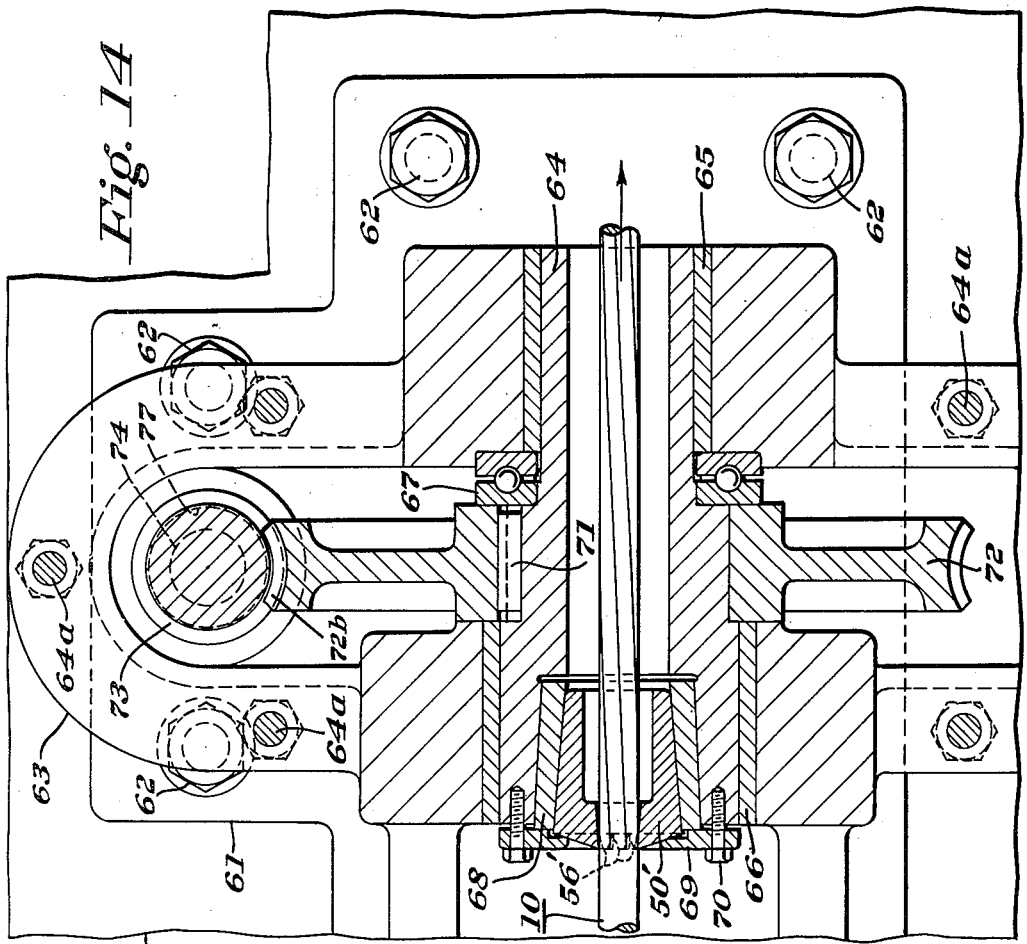
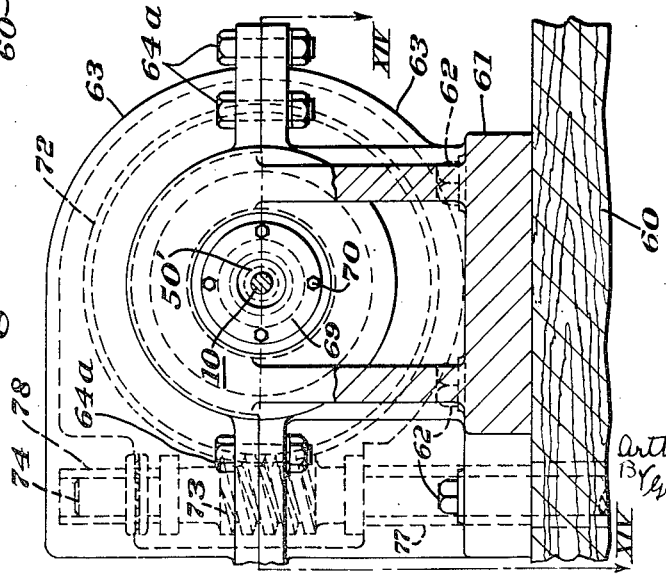

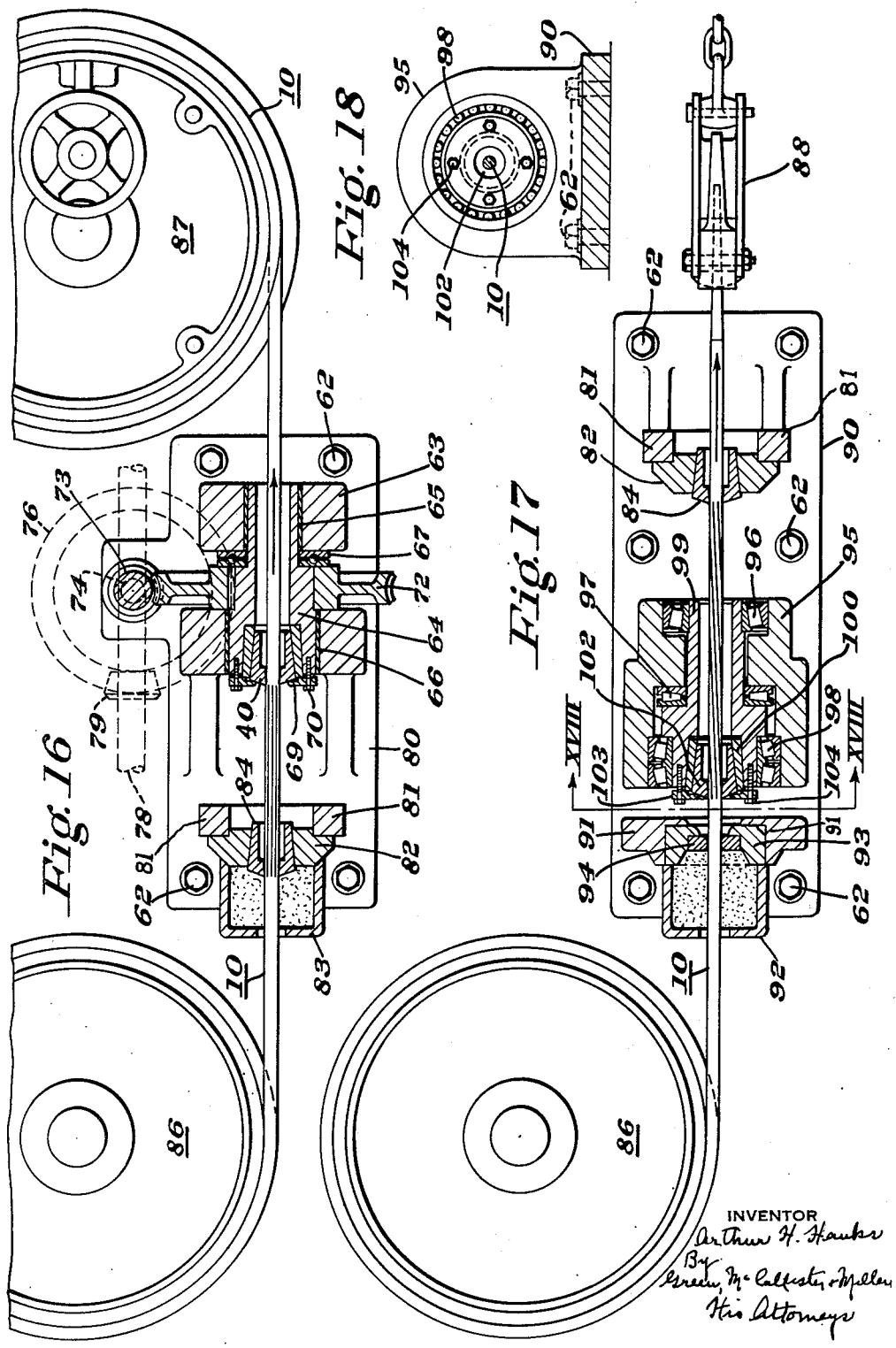

June 1, 1954            A. H. HANKS            2,679,680
WIRE-COURSING DIE
Filed Feb. 1, 1947            6 Sheets-Sheet 6
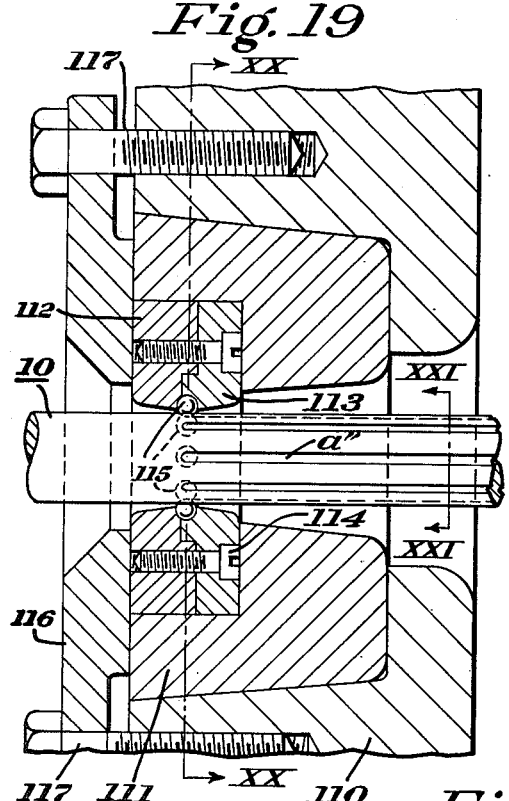
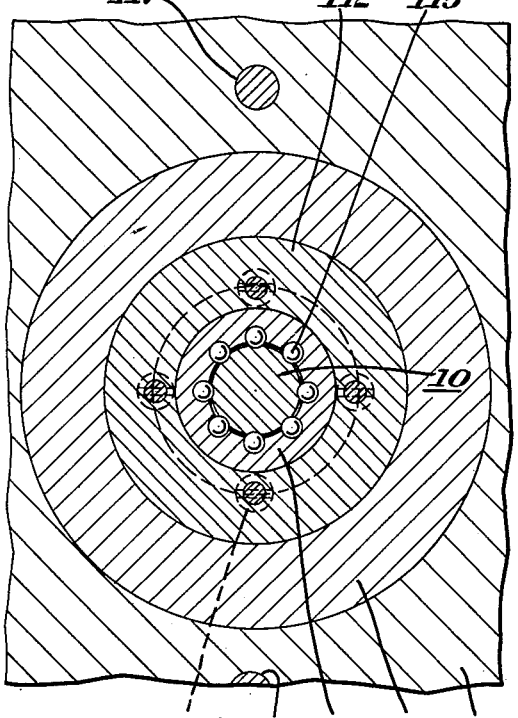
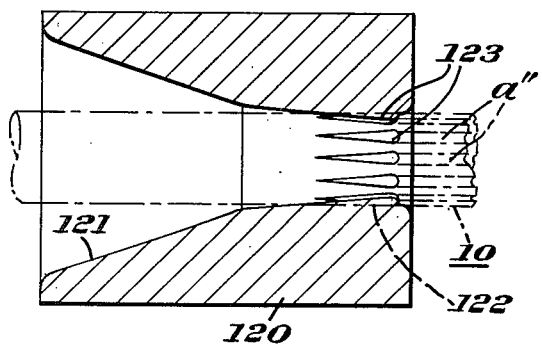
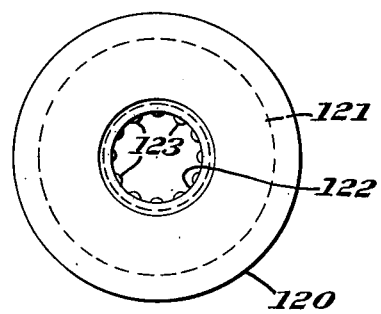
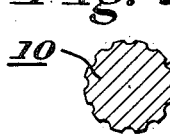
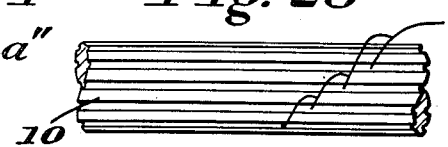

Patented June 1, 1954

2,679,680

UNITED STATES PATENT OFFICE 2,679,680

WIRE-COURSING DIE

Arthur H. Hanks, Dunkirk, N. Y., assignor to Allegheny Ludlum Steel Corporation, a corporation of Pennsylvania Application February 1, 1947, Serial No. 725,837

2 Claims. (Cl. 29—95.1)

This invention relates to the production of metal wire, and more particularly, to the surface conditioning of wire metal lengths.

The term "wire" as employed, includes any metal length having a size such that it is capable of being drawn through a die. The term "rod" as employed includes any metal piece or length having a size such that it is capable of being hot or cold rolled. I do not exclude any suitable shapes or composition of metal stock employed and I contemplate tubular as well as solid stock.

Generally speaking, drawing operations effect a reduction in area and an elongation of length of a wire and produce a so-called surface or layer working effect upon the wire. The customary procedure in producing finer or higher gauges of wire involves progressive die-drawing operations with intermediate anneals. Although a cold drawing operation increases the tensile strength of the wire, it also produces a localized surface hardening effect and to prevent breakage, it is customary to heat treat at least intermittently and generally between each set of drawing dies. Although heat treatment can be employed to somewhat regenerate the desired properties of the wire, such as to increase its ductility, it has the disadvantage of also decreasing its strength characteristics. This is particularly important from the standpoint of finer wires that have to be forced through drawing dies and generally coiled without breakage or failure of the wire along its length. A drawing process is a sure test for detection of hidden flaws in a metal length, but is an expensive test if failure occurs.

Cold drawing invariably increases hardness, stiffness, tensile strength, and elastic limit, while at the same time, decreases ductility. This is particularly true of steels and ferrous alloys. However, unlike cold rolling, it does not produce homogeneity of physical properties. This is particularly disadvantageous in that it limits the type of finished product that may be obtained.

At the present time, there are two commercially employed methods of drawing. The so-called dry drawing process is generally employed in connection with low-carbon coarser wire. In accordance with this process, wire or rod, after having been annealed and hot rolled, is coated with a layer of lime. Such lime is generally applied in liquid form and baked thereon. The lime serves to carry a lubricant, such as pulverized soap, oil mixed with meal and flour, or tallow during subsequent drawing operations; to a certain extent at least, the lime also serves as a lubricant. At the present time, the so-called dry drawing process is limited as to the gauge of wire that can be drawn without intermediate annealing, generally around 17¼ gauge or a maximum of 20 gauge. As a rule, rejections and failures become prohibitive where the final gauge is higher than about 17 gauge.

Where wire smaller than 17 to 20 gauge is to be drawn, the rod or wire length or stock is subjected to a so-called wet or liquid finish drawing. That is, the material is drawn wet through a bath of liquor, such as rye meal, flour and water which has been allowed to ferment. In this wet process, the wire is removed from the wet wash and dipped into a coating solution of correct composition to give the desired type of coating, for example, it may be provided with a coating of brass, copper, or tin. Such coatings are extremely thin and cannot be relied upon to give much protection against corrosion. The percentage reduction per draft is materially less in wet than in dry drawing and is much more expensive. It has heretofore been possible to draw wire up to 44 gauge employing this process, depending upon the particular chemical composition of the metal involved.

The heat treating processes used in the wire industry are generally annealing and patenting. Annealing is employed in connection with soft or low-carbon steel wire to refine and make a more uniform grain structure and to soften the wire after cold drawing. Since, for a given length of metal, the grain structure varies considerably, annealing may be employed initially to provide a uniform temper. Annealing is generally carried out by heating to a temperature just above the critical range of the metal involved. Rapid or slow cooling can be employed to give variations in grain structure as well as hardness. Any heat treatment, however, tends to decrease tensile strength.

So-called process annealing involves heating to restore the ductility of drawn, low-carbon wire and employs a temperature above the critical range sufficient to relieve strains. Wire is a little stronger and slightly less ductile in this case than if fully annealed and has superior drawing-down properties. Hence, it is preferred in processing wire.

Patenting is a heat temperature treatment conducted as a continuous process and consists in first heating the material to a point considerably above its critical temperature and cooling through the critical temperature at a comparatively rapid rate. It gives a better control of structure of the wire and forms less scale. The wire has two characteristics, namely, a fineness of grain and a more finely divided iron carbide. Patenting is used in connection with high strength tough wire having a higher carbon content, such as .25% or higher.

Hardening and tempering, such as employed when spring wire and other special type of wire is required, involves heating in a muffle, tube or electric furnace, or in molten lead, and quenching in water, oil, molten lead, or some other liquid.

It will appear from the above discussion that the production of wire, particularly wire of higher gauges, presents many problems and is generally an expensive process. This is especially true where it is desired to produce a wire having desired surface characteristics, and a desired cross-sectional homogeneity, based upon its chemical composition. Wire for some applications, for example, of 18-8 or straight chromium stainless or rustless steel should have a high resistance to corrosion, a high brilliancy, brightness and smoothness of surface, as well as sufficient ductility. Heretofore, wire produced by drawing operations is surface-hardened and has minute surface imperfections that become enlarged when the stock is electrolytically cleaned.

It has been an object of my invention to provide new and improved procedure for making wire.

Another object has been to provide a wire product having improved metallurgical and physical properties.

Another object has been to devise procedure for making wire whereby surface defects may be eliminated and characteristics improved, a more homogeneous product obtained, rejections minimized, and a close control of ductility, density, hardness, strength, surface porosity and decarburization may be obtained.

A further object has been to provide more efficient and effective procedure for making wire.

A still further object has been to devise improved apparatus for making wire.

These and many other objects of my invention will appear to those skilled in the art from the embodiments chosen for the purpose of illustration, the general description, and the claims.

In the drawings:

Figure 1A is a similar view illustrating a modified procedure which may follow step 3 of Figure 1; in other words, it may be inserted after the line IA—IA of Figure 1;

Figure 1B is a side section in elevation showing a fixture and apparatus layout exemplary of an embodiment of my invention;

Figure 1C is a side sectional view in elevation of another layout employing my invention;

Figure 1:
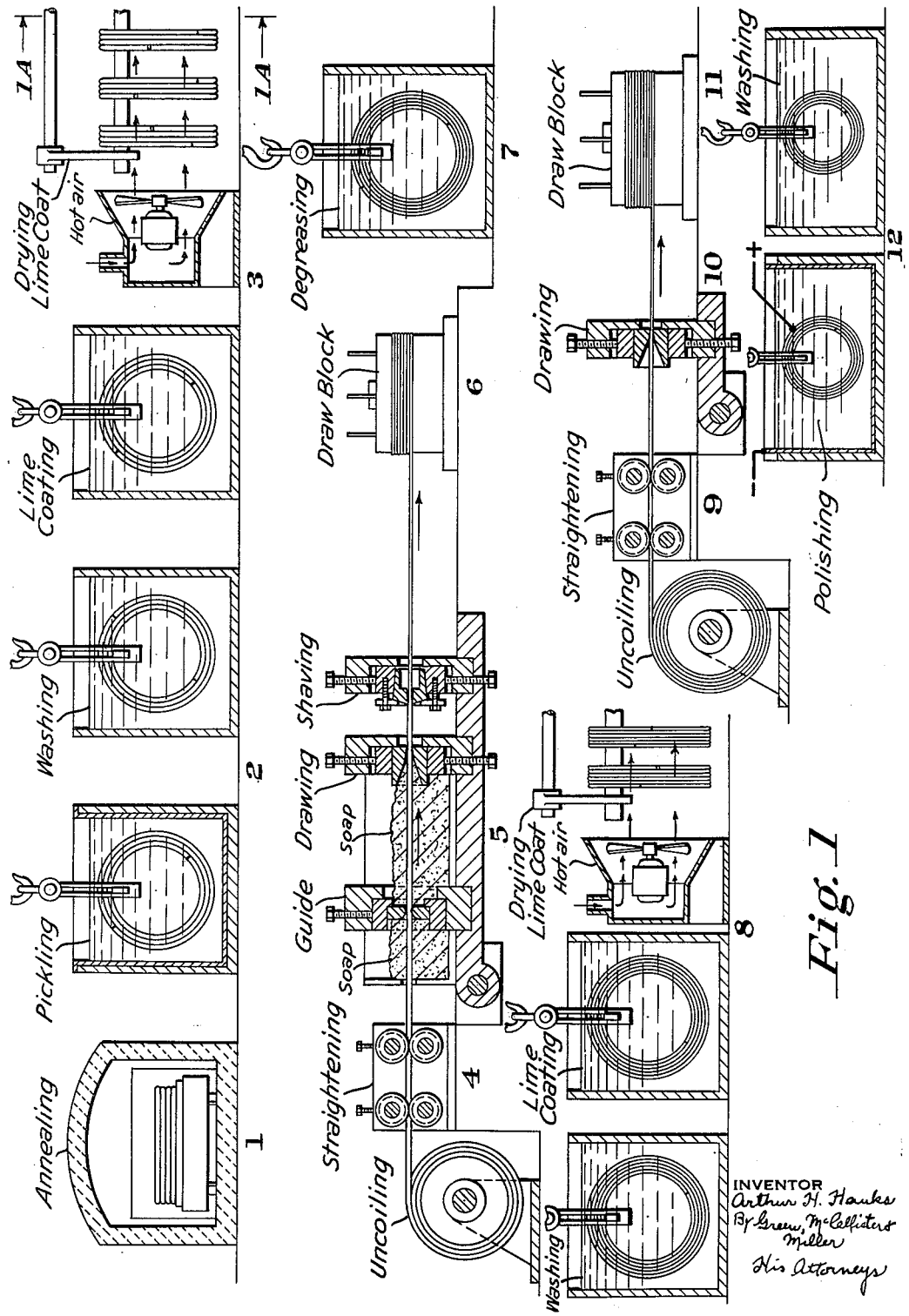
Figure 1 is a diagrammatic layout in side sectional elevation, illustrating an exemplary procedure utilizing my invention.

Figures 1D, 1E, and 1F are front views in elevation and partial section taken along the lines IF—IF, ID—ID, and IE—IE of Figure 1B and illustrating details of the die fixture of Figure 1B;

Figure 2 is a side perspective view and Figure 3 is a side sectional view in elevation of a form of shaving or cutting die that may be utilized in accordance with my invention;

Figure 4 is a front end view in elevation and Figure 5 is a side sectional view in elevation of another form of shaving or cutting die;

Figure 6 is a front view in elevation and Figure 7 is a side sectional view in elevation of a form of coursing die constructed in accordance with my invention;

Figure 8 is a front view in elevation and Figure 9 is a side sectional view in elevation of a modified form of coursing die;

Figure 10 is an end sectional view and Figure 11 is a side fragmental view of wire stock processed in accordance with my invention; Figure 11 illustrates two steps of my procedure; these views show straight longitudinal course lines produced by a cutting action and may be effected by utilizing a die such as shown in Figures 6 and 7 while holding the die in a non-turning relationship with respect to the metal stock;

Figures 12 and 13 are views similar to Figures 10 and 11, but show spiral lines or course cuts that may be produced by turning or rotating the die of Figures 6 and 7 or by utilizing the die of Figures 8 and 9;

Figure 14 is an enlarged horizontal sectional view taken along the lines XIV—XIV of Figure 15 and illustrates apparatus for effecting a positive rotation of any suitable form of coursing die constructed in accordance with my invention to produce cross lines or spiral lines longitudinally of the metal stock;

Figure 15 is an end view in elevation of the apparatus of Figure 14;

Figure 16 is a horizontal view, partially in section of an apparatus layout showing a leading stationary die holder and a following driven die holder; the fixture for the dies is shown sectioned along the stock or wire being processed;

Figure 17 is a figure similar to Figure 16 wherein the fixture is provided with a guide or straightening die, a floating or freely-rotating die holder, and a stationary die holder;

Figure 18 is a front cross sectional view taken along the line XVIII—XVIII of Figure 17;

Figure 19 is an enlarged side sectional view in elevation illustrating another form of coursing die utilizing the principles of my invention;

Figure 20 is an enlarged cross sectional view in elevation taken along the line XX—XX of Figure 19;

Figure 21 is a cross section of wire stock processed by utilizing the scoring or coursing die arrangement of Figures 19 and 20;

Figure 22 is a side sectional view in elevation through another form of coursing die wherein score lines or impressions are compressed or marked along the stock as it is forced or pulled lengthwise therethrough;

Figure 23 is a rear end view of the die of Figure 22 (taken from the right side of Figure 22);

Figure 24 is a cross sectional view through a piece of wire or stock showing score lines produced by the scoring die of Figures 22 and 23;

Figure 25 is a longitudinal fragment of the stock of Figure 24, also illustrating the score lines; and Figure 26 is a longitudinal, somewhat diagrammatical perspective view illustrating cutting or shaving in accordance with one phase of my invention.

Generally speaking, in carrying out my invention, I prefer to effect a maximum preliminary reduction of a metal length in any suitable manner, such as by hot and cold rolling or die drawing; and, any suitable heat treatments may be employed. That is, the stock may be preliminarily sized and heat treated to provide a desired preliminary grain structure.

I prefer to start with hot rolled coils as produced commercially, anneal, pickle, and then apply a dry or wet draw coating. Although in the exemplary embodiments of my invention, see for example Figure 1, I show such treatment as being effected while the stock is in coil form, I also contemplate effecting the treatment while the stock is moving continuously. This is also true as to other treatments illustrated as effected while the stock is in coil form.

In the next step, the wire or metal stock may be passed through a sizing draw die, and is subjected to one or more die-shaving operations wherein a surface layer or layers is substantially uniformly cut off or removed to effect a reduction in diameter, without causing elongation. The shaving operation is carried out in such a manner as to remove porous surface portions, as produced by heat treating or hot working operations; and, to remove so-called decarbonized surface portions, where carbon containing metal stock is used. I also have been able to remove transverse and longitudinal cracks, scale, surface imperfections, notching effects, and other imperfections, such as pits. The shaving operation or operations may be effected by drawing the wire through one or a series of successive shaving dies by means of any suitable draw frame or drum. The new surface produced is very dense and compact. To improve ductility, etc., surface-hardened portions, such as produced by cold drawing, may be fully or partially removed, depending upon the depth of cut effected.

Heretofore it has been customary to attempt to remove surface imperfections after the completion of a final die-drawing or sizing operation by some suitable method, such as centerless grinding. The metal stock may then be cut into suitable lengths and, for some applications, is welded. In the case of stainless steels, for example, welding produces discoloration and an electrolytic cleaning operation is used to remove such discoloration and to brighten the surface. Such an electrolytic cleaning operation causes any small pits or imperfections in the wire to be enlarged, preferentially.

Although I have suitably interspersed die-drawing and heat treatment operations with die-shaving operations, e. g. see Figure 1C, generally speaking, I prefer to start with a stock-straightening operation, shave, and to finish with either a shaving or a final cold drawing operation, see Figures 1, 1A, 1B and 1C. I also prefer to preliminarily remove surface imperfections by shaving before reducing the wire to finer or final gauge. Particularly, where the wire is to be bent into suitable shapes, I prefer to finish or substantially finish with a shaving operation to condition the wire and thus, prevent breakage due to hardness of surface imperfections; if a final draw is used, I prefer a light draw.

I find that the shaving of wire, when carried out in accordance with my invention, provides a highly improved surface whose micro lines are in the direction of the axial length of the stock providing improved electrical conductivity. The fatigue strength of the wire is increased and a suitable ductility is retained. Improved ultimate characteristics and an assurance of homogeneity throughout its diameter also follow. I also have found that if an electrolytic polishing operation is employed, e. g., one using sulphuric or phosphoric acid, that the time and intensity of the polishing may be materially shortened, thus effecting a saving in cost of operation as well as minimizing loss of metal.

Shavings can be produced in random or any suitable widths and are valuable as scrap or for the manufacture of metal pads, metal cloth, etc. As will be hereinafter explained, I may produce chips of any suitable size by rotating the die or by employing a two-step shaving operation.

I have been able to also retain positive and absolute control over the ultimate characteristics of the final wire product. A much more light emissive, reflective, or brilliant surface is obtained than heretofore in connection with stainless steel, for example. I have also been able to eliminate or minimize the necessity for intermediate annealing between operations and to extend the range of dry processing into the full gauge range of wet processing. The wet processing range is extended to produce wire of higher gauge than heretofore possible and is only limited by available die sizes. That is, I have been able to go beyond the normal 44 gauge size which is about the maximum in accordance with present day practice.

The depth of cut will depend upon the type and size of metal stock employed and the type of resultant product desired. For example, using stainless steel stock of approximately .400 to .300 inch in diameter, I have utilized a depth range of cut in one shaving die of from about .001 to .030 inch, although I ordinarily cut about .0035 to .004 inch in finishing stainless steel wire. The shaving dies used are preferably of the general types illustrated. In the forms shown in Figures 2 to 5, a conical inner surface or bore converges or tapers toward the stock-entering end of the die and the die also has a substantially abrupt conical outer face converging towards the stock-entering end to form a leading severing or cutting edge or outer lip ring. The latter slopes or inclines upwardly backwardly from the stock-entering end of the die.

As previously pointed out, the surface-conditioning procedure here under consideration consists of a two-step operation. The surface of the wire is preliminarily conditioned for the purpose of providing one or more actual or incipient break lines for the surface layer or layers removed therefrom. This conditioning may be accomplished by the removal of metal from the surface of the wire so as to form a fine or narrow groove-like course, preferably to a depth sufficient to substantially cut through the portion of the wire to be removed by shaving.

The conditioning may also be accomplished by compressing spaced portions of the surface of the wire so as to provide by a work-hardening operation, regions which are work-hardened and also intermediate regions which are substantially free from work-hardening. The surface conditioning, under conditions such as to occasion work-hardening, may be termed scoring. It may also be accomplished by line-compressing the surface of the wire, i. e., by subjecting the wire surface to compression applied by a small, blunt, ball-like or rounded edge or instrument under conditions such that the resulting line or lines of compression extends along, across or both along and across the surface of the wire. The surface conditioning may also involve a combination of metal removal and surface-compression, but however accomplished, is for the purpose of providing one or more courses, i. e., actual or incipient lines of break which extend along, across or spirally of the wire surface.

I broadly define the operation which results in the formation of such lines of break as a coursing operation with the understanding that coursing involves either a grooving operation, a scoring operation, as herein described, or a combination of both such operations. Independently of the specific procedure employed, coursing produces one or more courses or lines of break along the surface being conditioned, which preferably extend to a depth sufficient to be effective in connection with all surface layers removed by the shaving operation.

As indicated, the surface conditioning here defined involves a wire shaving operation which follows the coursing operation and which results in the removal of one or more surface layers, depending upon the depth of the surface imperfections in the wire, or the reduction in diameter to be accomplished. In any event, the shaving will preferably accomplish a surface removal to a depth at least equal to the effective depth of such course or courses as may be formed by the coursing operation.

As previously pointed out, I contemplate rotating the shaving die or providing a pair of dies, one of which may be used to provide one or a series of spaced courses along the stock, and the other of which may be used to shave across such courses to sever the surface of the stock into small pieces or chips.

As shown in Figures 12, 13 and 25, preliminary lines or courses $a$ can be produced by a groove or by a score. In the coursing operation, I may condition spaced portions of the metal surface as the stock is advanced. The coursing step may be employed to provide substantially uniform desired width shaved lengths, or preferably, to provide shaved chips, as will appear from exemplary embodiments of my invention shown in the drawings.

The spacing between dies need only be sufficient to permit the collection or removal of shavings or chips. Various shapes such as rounds, hexagonals, etc., may be produced in accordance with my invention. The exact design of the shaving die will depend upon the shape of the wire that is to be produced as well as the type of metal stock used.

The drawings are only exemplary to show some applications of my invention. For example, steps illustrated, for example in Figures 1, 1A, 1B and 1C, may be interchanged and omitted, etc., without departing from my invention. Where I have shown a shaving or cutting die, a pair of dies, or in other words, a die combination employing a coursing and a shaving die, may be substituted in accordance with my invention. Either, both, or none of the dies of the combination, or the shaving die, itself, may be driven, freely rotatable, or stationary.

In utilizing a phase of my invention, wire stock is shaved or a surface layer cut off substantially uniformly about the periphery of the stock by advancing or pulling the stock through a die or a die combination. In such event, the annular severing or cuttings edges, such as 45 or 45' of the dies of Figures 3 and 5 slide along the stock as the latter is advanced to provide a cylindrical layer. The cylindrical layer, band, or shell will advance over the conic or forwardly sloped outer surfaces or faces 44 or 44' of the die to expand the cut off layer into a cone $b$, see Figure 26. If the metal is a ferrous alloy, for example, the cone will continue to expand until incipient lines of breakage or failure $c$ are formed and separate to provide jagged shaving lengths or segments $d$ of random or haphazard width. As the shaved off layer continues to advance and expand over the front face of the die, the segments $d$ tend to curl and form continuous shavings.

The shaving die may be rotated or may be mounted in such a manner that it is free to rotate; in the latter case, I find that friction is minimized, although the cut is made in a substantially spiral manner.

In another utilization of my invention, the wire stock 10 is first provided with a series of longitudinal courses which may be in the form of fine cuts $a$ or $a'$ see Figures 11 and 13 of the drawings, or in the form of scores $a''$, see Figures 21, 24 and 25. The depth and type of course produced can be controlled by the type of cutting, grooving, scoring or tool surfaces provided. It will also be apparent that I can produce straight longitudinal, transverse or spiral courses.

I have mounted the coursing die to operate in a stationary manner, to freely rotate as a floating die or to be positively actuated by a suitable gear mechanism, although as above stated, I find that friction is minimized and a highly efficient action is obtained by mounting the coursing die so that it is free to rotate as the stock is pulled therethrough.

The distance or spacing between the cutting or scoring edges will depend upon the desired width of shavings or chips to be produced. It will be apparent that if stock having straight longitudinal lines such as $a$ of Figure 11 is then drawn through a shaving die such as shown in Figure 5, that shavings will be produced of uniform width. However, if the shaving die is rotated across the longitudinal courses the surface layer will be shaved or cut off in the form of small chips. This latter procedure is preferable in some cases where the spacing between the dies is close in that the chips are much easier to remove.

Briefly, I contemplate following the coursing step by a shaving step which may be employed in such a manner as to produce either shavings or chips as desired. A die such as shown in Figure 9 will produce spiral lines when relative movement is permitted between it and the stock; and, when followed by a die, such as shown in Figures 3 and 5, will result in chips. Such shaving die may be held stationary or rotated as desired. Dies such as shown in Figures 7 and 9 may also be employed for simultaneously coursing and shaving the stock, provided the stock length is of a sufficient diameter to be shaved by their annular cutting edges.

Suitable forms of so-called scoring or metal depressing dies are shown in Figures 19, 20, 22, and 23. The score or cut may be slightly less than the desired depth of the layer to be shaved by the shaving die of the combination or may be substantially the same or slightly greater, depending upon the exact result desired. That is, one coursing die may serve a number of shaving dies or may serve one.

Referring particularly to the diagrammatic layout of Figure 1 of the drawings, I have shown a procedure which has been successfully utilized in producing improved wire in accordance with my invention. Carrying out this procedure, I take ordinary hot and/or cold rolled wire, anneal it as step 1, pickle and wash it as step 2, and lime coat it and dry it as step 3. At this point, the procedure may continue as shown in Figure 1 or may be followed by an intermediate procedure such as shown in Figure 1A. When the procedure is carried out in accordance with Figure 1, the lime-coated coils are uncoiled and straightened as step 4, guided, draw sized and shaved as step 5, and recoiled and drawn at 6. The coils are degreased and washed as step 7 and again lime-coated and dried as step 8. Straightening may be effected as step 9 (or may be effected by the die, itself), bright drawing as step 10, and recoiled as step 11 by a drawing drum. The bright drawn wire is then shown as electrolytically polished and washed at step 12.

Referring to Figure 1A, wire, after having been lime-coated at step 3, may be passed through one or more drawing dies as step 3a and recoiled as step 3b. After reannealing as step 3c, the coil is pickled and washed as step 3d, and lime-coated and dried as step 3e, ready for continuation of the procedure, beginning with step 4 of Figure 1.

In Figure 1C I have shown the lime-coated coil as being uncoiled, straightened, drawn, shaved in a pair of shaving dies, drawn, shaved, and then recoiled. After recoiling it is degreased and washed ready for use. This figure illustrates that the drawing and shaving operations may be interspersed and that one or more shaving or drawing dies may be used in accordance with my invention to obtain wire of any desired size and/or surface and other characteristics. It should be noted that the shaving operations of Figure 1C eliminate the necessity for heat treatment between drawing operations. The shaving operation, as previously pointed out, can be employed in effect to remove cold hardened surfaces, such as produced by cold drawing, or to remove hot porous surfaces, such as produced by heat treatment.

Figure 1B is illustrative of a form of fixture or apparatus that may be employed in carrying out my invention, see also Figures 1D to 1F, inclusive. The fixture comprises a bed plate 21, a guide support block 22, a guide mounting ring 23, and a guide ring 24. The mounting ring 23 may be split as shown in Figure 1F and clamped tightly against the guide 24 by an adjustable bolt 25. The guide ring 24 may be of metal, or preferably of fiber to avoid injury to the wire stock. The wire 10 is preferably heat treated, cleaned, and lime coated as indicated in previous drawings and first drawn from a reel through the guide ring 24 to straighten it. Subsequently, the wire enters a draw die 28 which may be of any suitable conventional type, although I have shown a draw die that is interchangeable in its mounting with a coursing or shaving die.

In this particular apparatus arrangement, I have shown a draw die block 26 mounted in the bed plate 21 and extending upwardly therefrom and cut out to receive a die mounting ring 27. As shown particularly in Figure 1D, the die mount block 27 is adjustable from four transverse sides by bolts 31 so the die can be accurately aligned, particularly with respect to a succeeding die 35. The draw die 28 is shown held in position by a mounting plate 29 and bolts 30 secured to the ring 27. I have shown an open top soap box or container 32 of rectangular shape which provides any suitable form of lubricant for the wire during its passage through the guide die, drawing die, and particularly the latter. This, of course, provides sufficient lubrication for a subsequent shaving operation.

Behind the draw die 28, I have shown a shaving die 35 which may be of the type shown in Figures 3 to 9; e. g., a shaving die or a combination coursing and shaving die. It is mounted by a block 33 on the bed plate 21. A die positioning ring 34 is shown secured in a fixed position by an adjustable bolt 36. I have also shown a guide die 24 following the drawing die which may be of the same type and mounted in the same manner as the guide which is ahead of the shaving die. The two guide dies thus aid in keeping the wire in alignment during the shaving and drawing operations, and the leading guide die serves the additional purpose of straightening the wire before it enters the shaving die.

In employing the fixture of Figure 1B, I also contemplate interchanging the respective positions of the draw die 28 and the shaving die 35 which are interchangeable to permit the wire stock to be first shaved and then drawn, and to also permit the use of a coursing die followed by a shaving die.

In Figures 2 and 3, the shaving or layer cutting die 40 is provided with an enlarged bore 41 which terminates at its front end in an outwardly converging conic bore 42. The major outer surface 43 of the die is shown as of conic form and is joined at its front end to a shaving, severing or cutting edge 45 by a cone-shaped expanding surface 44 of truncated cone-shape. This die is hollow ground and provides a circular or annular shaving edge 45 between the forward end of the conic bore 42 and the forward end of the hollow ground expanding surface 44.

The die of Figures 4 and 5 is somewhat similar to that of Figures 2 and 3, except that the front surface is not hollow ground. Similar numerals have been employed to designate similar parts, except that prime suffixes have been employed. In this case, the shaving, severing or cutting edge 45' is not as prominent or sharp as the embodiment of Figures 2 and 3.

Figures 6 and 7 show a form of coursing die which may be termed a die for cutting longitudinal fine lines along the stock as shown in Figures 10 and 11. The die 50 has a large bore 51 terminating in a forwardly converging conic bore 52. It is also provided with conic-shaped portions 53 and 54 as well as a cutting edge 55. Depending upon the size of the stock, a die of this type may be employed to course the stock only or to both course and shave it. If it is desired to segregate the coursing and shaving operations, the stock will be substantially the same size as the forward cutting edge of the die. The die is also shown provided with a plurality of spaced-apart, inwardly-projecting narrow tool or cutting surfaces 56 of any suitable spacing. Such radial surfaces 56 will course the stock, regardless of whether or not the size of the stock is such that it will be shaved by the edge 55.

Figures 8 and 9 show a die that is somewhat similar to that of Figures 6 and 7, except that the cutting edges extending within the bore 52' are inclined or slanted to provide a spiral cut along the stock, see Figure 13. Since this die is somewhat similar to the die of Figure 7, I have indicated similar parts by prime suffixes to avoid duplication of description. This die, like the die of Figure 7, may also be employed to simultaneously course and shave the stock, or to course the stock only.

In Figures 14 and 15 I have shown apparatus suitable for positively driving either a shaving or coursing die. This apparatus comprises a bed plate 61, mounted by bolts 62 on a support 60, and provided with a two-part housing 63 secured together by bolts 64a. The housing 63 carries a rotating sleeve 64 which is mounted within the housing by bearings 65 and 66 and a ball thrust bearing 67. The rotating sleeve 64 carries a die-supporting ring 68 and a suitable die such as 50'. The die 50' and the ring 68 are removably secured in position by a front mounting plate 69 and bolts 70. The bolts 70 are threaded into the rotating sleeve 64. The sleeve 64 is provided with a key 71 which secures a ring gear 72 thereon. The speed reducing ring gear wheel 72 is provided at its outer periphery with worm teeth 72b. A shaft 74 carries a worm gear 73 that is secured thereon and meshes with teeth 72b. As shown particularly in Figure 15, the drive shaft 74 is journaled in the housing by bearings 77 and 78.

Referring to Figure 16, I have shown apparatus employing a coursing and shaving die combination. The stock 10 is drawn from a reel 86 by a power driven reeling drum 87 in the usual manner. The apparatus fixture comprises a bed plate 80 secured by bolts 62 to any suitable mounting. The stock 10 first enters a coursing die 84 which is mounted on the bed plate 80 by a pair of upwardly extending spaced-apart brackets 81. The brackets 81 carry a die-support ring 82. A lubrication box 83 with an open top is shown as mounted on the bed plate 80 and extending upwardly therefrom to substantially close in the front end of the die-mounting ring 82.

From the coursing die 84, the stock enters a positively actuated rotatable shaving die 40. The rotating mechanism is the same as shown in Figures 14 and 15 and will not be again described. This figure also shows a bevel gear wheel 76 mounted on the worm shaft 74 which is actuated by a drive shaft 78 through a pinion gear 79. The shaft 78 may be actuated by any suitable motive means.

In Figures 17 and 18, I have shown a modified apparatus arrangement wherein the stock 10 is first straightened by a guide then passes through a floating or freely rotating scoring die to a stationary shaving die. It will be noted that instead of a drum, I have indicated a drum grapple 88 for gripping the stock 10 while it is recoiled. In the embodiment of Figure 16, the coursing die 84 effects a straightening action, while in the embodiment of Figure 17, a guide die 94 is employed for this purpose. The guide die 94 which may be a fiber ring, for example, is mounted by a pair of spaced-apart upwardly extending brackets 91 which are a part of the bed plate 90 and carry a die mount 93. An upwardly open lubrication-containing box 92 is mounted on the bed plate 90 and extends upwardly to substantially close the front end of the guide die. After the stock has been straightened by the guide die 94, it enters a coursing die 102. A housing 95 of two-part, bolted construction is secured on the bed plate 90 and rotatably supports a rotating sleeve member 99. Roller bearings 96, 97 and 98 carry the member 99. A die supporting ring 100 is positioned within the member 99 and receives a die 102. The die 102 is secured in position by a mounting plate 103 and bolts 104 which are threaded into a front end of the sleeve 99.

It will thus be seen that the die 102 is free to rotate while it is coursing the stock 10. If the die 102 is provided with spiral cutting or scoring edges, its rotation will follow the slope of such edges. In the various embodiments of my invention, I contemplate utilizing tool steel or any suitable non-ferrous metal for the cutting or scoring surfaces, for example, a stellite, a high speed tool steel, a carbide, or a carbon alloy may be used. After the stock has left the coursing die 102 it enters a shaving die 84 which in Figure 17 is shown as mounted in a stationary manner by a pair of spaced-apart brackets 81. The brackets 81 extend upwardly from the bed plate 90. A die support ring 82 may be removably secured to the brackets 81 in any suitable manner. The shaving die or its cutting surfaces may be made of any suitable metal or such as above mentioned in connection with the coursing dies.

In Figures 19 and 20, I have shown a scoring die utilizing a ball type of scoring surface. The die block 110 is shown as carrying a die ring 111 within its bore. The die ring 111 in turn carries a pair of complimentary split members 112 and 113 which forms a race for the scoring balls 115. These balls may be of any suitable tool steel or metal such as previously mentioned. That is, they should be relatively hard and will be mounted to freely rotate within their individual races in the members 112 and 113. It will be noted that these members are secured together by set screws 114 and that they are held in position within the die ring by a front mounting plate 116 and bolts 117 which are threaded into the die block 110. It will be apparent that this assembly may be mounted in a stationary manner as shown, or for free or positively driven rotation as indicated by the previously described embodiments of my invention. Figures 19 and 21 show scores $a''$ produced longitudinally of the stock 10.

In Figures 22 and 23, I have shown a further embodiment of my invention wherein a die 120 is provided with an enlarged conic bore 121 at its entry end terminating in a cylindrical bore 122. Narrow, spaced-apart scoring edges or surfaces 123 radially depend and slope to converge outwardly towards the discharge end of the die. The tool surfaces 123, in effect, define a conic area.

I have been able to produce stainless steels in accordance with my invention having a high finish without the resultant hardness of cold drawn wire. Thus, the wire product may be cold formed or bent much more easily and will have a surface whose lines are such as to improve any subsequent electrolytic polishing thereof. The product also has a much greater fatigue strength.

My invention has also been found to have value in connection with the manufacture of non-ferrous and ferrous tool metals and alloys, particularly from the standpoint of removing surface decarburization or carburization, seams and rolling defects, as well as from the standpoint of homogeneity of physical characteristics. As to spring wire, my process provides a better product devoid of surface decarburization and having greater fatigue strength.

Softer, harder, or any intermediate type of ferrous wire can be readily provided in accordance with my invention by, as I have previously pointed out, cold or hot drawing and/or heat treatments may be suitably interspersed with shaving operations. The speed of the operation has been increased, continuity of operation may be effected, and rejections and failures have been markedly decreased.

Referring to Figure 1, for example, if I wish to provide a cold drawn surface of certain hardness or with a bright drawn finish, I can finish the operation with a cold die instead of the shaving die.

The shaving operation may be effected at ordinary room, hot, or sub-zero temperatures. Ordinarily, I prefer to operate at about room temperature. I have successfully used my process in connection with the production of stainless, rustless, chromium, chrome-nickel, carbon, and various other ferrous steels or alloys, or high speed tool steels. It also is useful in connection with the production of non-ferrous metal tool cutting stock, e. g., containing tungsten, molybdenum, cobalt, chromium, nickel, manganese, carbon, etc. Generally, I also prefer to effect the maximum practicable reduction to the stock before starting the shaving operations.

The spacing between the shaving dies is not critical, but will be spaced closely enough to prevent bending or distortion of the stock.

It will be appreciated by those skilled in the art that the principles of my invention may be applied in obtaining any desired type of wire. That is, the chemical composition of the stock may be chosen and then cold and hot working operations may be carried out on it to obtain a wire product that may be softer and relatively ductile, that may be hard, and have a relatively high tensile strength, or that may be a combination of the two. For example, if a product having a fine crystalline structure is desired, the stock may be heat treated and cooled in such a manner as to produce this result, taking into consideration the chemical composition of the metal involved. Then, the stock may be shaved to final gauge; the amount of cut will be sufficient to effect a removal of the porous layer produced by the heat treatment. If the metal is of a type whose surface decarburizes under heat treatment, the depth of cut will be sufficient to remove the decarburized portions.

If a more flexible and hard final product is desired, the stock may be subjected to one or more cold drawing operations after the hot treated product has been shaved. After the cold drawing operation, further shaving may be effected to remove surface defects and a desired depth of cold treated surface layer. Many other variations in the application of the procedure or of the invention involved will appear to those skilled in the art. For example, the stock may be hot drawn and then shaved. The shaving operation, itself, may be carried out as a hot, cold or low temperature process. When stainless steel wire is being processed, I, however, prefer to finish with a shaving operation, particularly, if the wire is to be electrolytically polished for reasons that will be apparent from the previous discussion.

Where different characteristics of the stock are desired, transversely of its cross section, the depth of cut effected along one longitudinal surface line may be greater than an adjacent line.

Referring to Figures 3 and 5, for example, it will appear that the cutting edge 45 or 45′ is of annular shape and lies on a transverse plane such that endwise cutting forces are always exerted on the wire in the same common plane, fully longitudinally of the wire, and uniformly about the wire. During the movement of the wire relative to the die, the compacting or densifying action is effected on the newly exposed wire surface by an inner, surface-densifying edge lying on the same common plane as the cutting edge of the die at a position of maximum convergence of the bore wall and as the wire advances along the bore. "Relatively hard metal" as employed in this application refers to ferrous metal generally, and to ferrous and non-ferrous harder metals and alloys such as used for tools. It excludes soft non-ferrous metals such as copper and aluminum.

Many modifications, revisions, additions and subtractions may be made in connection with the practice of my invention without departing from its spirit and scope as indicated by the appended claims.

What I claim is:

1. A wire coursing die of hollow form having a cone-shaped, open-end bore converging towards a front end thereof, a cone-shaped front face sloping upwardly-backwardly from the front end of said bore and defining a continuous cutting edge forwardly of the die, and a plurality of peripherally-inclined and spaced-apart longitudinally-extending coursing projections within said bore extending backwardly therealong.

2. A wire coursing die of hollow form having a cone-shaped, open-end bore wall converging towards a front end thereof, a truncated cone-shaped front face sloping upwardly-backwardly from the front end of said bore wall and defining a continuous front edge forwardly of the die, and a series of peripherally spaced-apart longitudinally-extending coursing projections on said bore wall and extending backwardly therealong from said front edge.

References Cited in the file of this patent

UNITED STATES PATENTS

| Number | Name | Date |
|---|---|---|
| 166,337 | Brown | Aug. 31, 1875 |
| 170,806 | Benwell | Dec. 7, 1875 |
| 320,497 | Possons | June 23, 1885 |
| 383,238 | Palmer | May 22, 1888 |
| 590,120 | Swinburne | Sept. 14, 1897 |
| 716,311 | Thomson | Dec. 16, 1902 |
| 772,841 | Smith | Oct. 18, 1904 |
| 1,182,971 | Bunting | May 16, 1916 |
| 1,321,962 | Wilcox | Nov. 18, 1919 |
| 1,361,568 | Donaldson | Dec. 7, 1920 |
| 1,501,081 | Wilcox | July 15, 1924 |
| 1,748,321 | Wilcox | Feb. 25, 1930 |
| 1,809,880 | Wise | June 16, 1931 |
| 1,842,631 | Rolle | Jan. 26, 1932 |
| 1,969,517 | Malloy | Aug. 7, 1934 |
| 1,989,242 | Monsch | Jan. 29, 1935 |
| 2,046,341 | McParlin | July 7, 1936 |
| 2,203,064 | Schueler | June 4, 1940 |
| 2,233,928 | Weaver | Mar. 4, 1941 |
| 2,281,132 | Young | Apr. 28, 1942 |
| 2,323,700 | Bailey | July 6, 1943 |
| 2,329,376 | Illmer | Sept. 14, 1943 |
| 2,338,687 | Johnson | Jan. 4, 1944 |
| 2,365,959 | Harwedel | Dec. 26, 1944 |
| 2,394,381 | Hoern | Feb. 5, 1946 |
| 2,413,192 | Pope | Dec. 24, 1946 |
| 2,435,660 | Tileston | Feb. 10, 1948 |
| 2,570,784 | Bain | Oct. 9, 1951 |

FOREIGN PATENTS

| Number | Country | Date |
|---|---|---|
| 426,029 | Germany | Mar. 2, 1926 |
| 521,446 | Germany | Mar. 23, 1931 |
| 369,936 | France | Jan. 24, 1907 |
| 701,768 | France | Mar. 23, 1931 |
| 866,793 | France | Sept. 3, 1941 |